(12) United States Patent
Sohn

(10) Patent No.: US 8,405,267 B2
(45) Date of Patent: Mar. 26, 2013

(54) PERMANENT MAGNETIC DEVICE

(76) Inventor: Chun Shig Sohn, Toronto (CA)

( * ) Notice: Subject to any disclaimer, the term of this patent is extended or adjusted under 35 U.S.C. 154(b) by 451 days.

(21) Appl. No.: 12/755,553

(22) Filed: Apr. 7, 2010

(65) Prior Publication Data

US 2011/0248587 A1    Oct. 13, 2011

(51) Int. Cl.
*H02K 7/09* (2006.01)
(52) U.S. Cl. ...................................................... 310/90.5
(58) Field of Classification Search ................ 310/90.5, 310/51; 384/99
See application file for complete search history.

(56) References Cited

U.S. PATENT DOCUMENTS

| | | | |
|---|---|---|---|
| 4,339,780 A * | 7/1982 | Okubo | 361/147 |
| 4,512,671 A | 4/1985 | Giers et al. | |
| 4,629,261 A * | 12/1986 | Eiermann et al. | 310/90.5 |
| 4,699,050 A * | 10/1987 | Heise | 100/168 |
| 5,104,284 A | 4/1992 | Hustak, Jr. et al. | |
| 5,334,965 A | 8/1994 | Dolgin | |
| 6,127,757 A | 10/2000 | Swinbanks | |
| 2002/0074883 A1* | 6/2002 | Yamauchi et al. | 310/90.5 |
| 2009/0108692 A1* | 4/2009 | De Luca et al. | 310/90.5 |

OTHER PUBLICATIONS

International Search Report and Written Opinion for International Application No. PCT/CA2010/002003 dated Apr. 26, 2011.
Segawa Hiroshi and Yamamoto Masayuki, "Magnetic Bearing", Electronic Engineering, Apr. 1999, pp. 30-35, vol. 4, Chomdan Inc., Republic of Korea.
Sungho Park, "Design of Lorentz force-type integrated motor-bearing system using permanent magnets and concentrated windings", Thesis(doctoral), 2006, Korea Advanced Institute of Science and Technology, Republic of Korea.
F. N. Werfel et al., "250 kW Flywheel with HTS Magnetic Bearing for Industrial Use", Journal of Physics, 2008, pp. 1-8, Conference Series 97 (2008), IOP Publishing Ltd.
Mark Siebert, et al., "A Passive Magnetic Bearing Flywheel", Feb. 2002, pp. 1-10, NASA/TM-2002-211159 IECEC2001-AT-89, National Aeronautics and Space Administration.
Wikipedia., "Magnetic bearing," accessed at http://en.wikipedia.org/wiki/Magnetic_bearing, last modified on Jul. 13, 2012, pp. 5.

* cited by examiner

*Primary Examiner* — Nguyen N Hanh
(74) *Attorney, Agent, or Firm* — Workman Nydegger

(57) ABSTRACT

An apparatus to operate with a rotor includes a plurality of permanent magnetic components and a plurality of hydraulic cylinders. The permanent magnetic components are arranged to surround the rotor. The hydraulic cylinders are coupled to permanent magnetic components and are connected via at least one hydraulic tube.

15 Claims, 12 Drawing Sheets

PERMANENT MAGNETIC DEVICE

BACKGROUND

A bearing is a device to allow constrained relative motion between two or more parts and to reduce frictions between the parts. Bearings can be classified broadly according to the motions they allow and according to their principle of operation, as well as by the directions of applied loads they can handle. For example, bearing can be classified into a contact bearing and a non-contact bearing. A contact bearing contacts a rotating object to support the object. A non-contact bearing does not contact a rotating object with a gap between the non-contact bearing and the rotating object, to support the object. However, there is a possibility for the rotating object to move in a radial direction due to the existence of the gap between the non-contact bearing and the rotating object, thereby a balance of the rotating object may be lost.

DETAILED DESCRIPTION

Figure 1A:
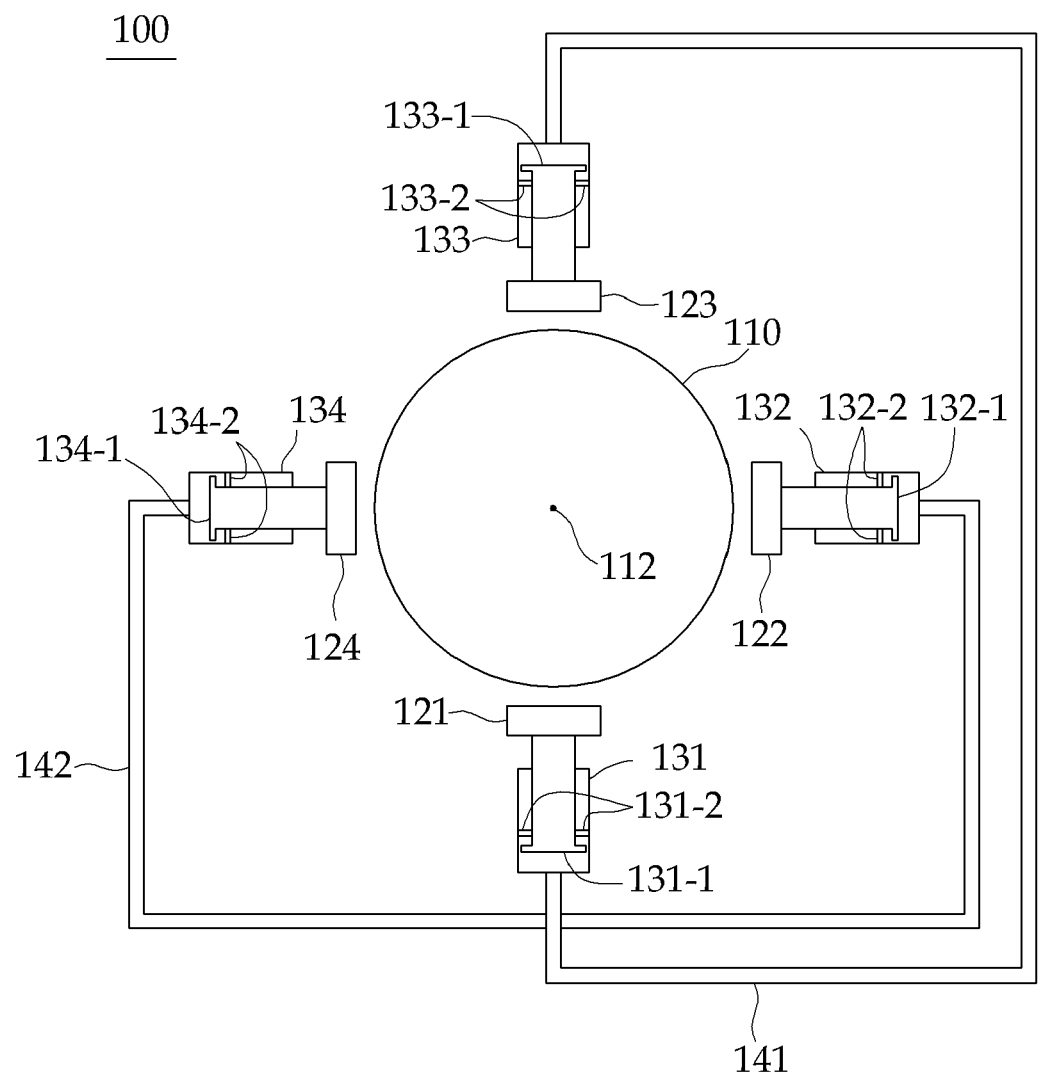
FIG. 1(a) is a horizontal sectional view of an illustrative embodiment of an apparatus to operate with a rotor and FIG. 1(b) is an enlarged diagram of the permanent magnetic component and the hydraulic cylinder shown in FIG. 1(a).

In some embodiments, an apparatus to operate with a rotor includes a plurality of permanent magnetic components and a plurality of hydraulic cylinders. The permanent magnetic components have a same magnetic pole as the magnetic pole of the rotor and are arranged to surround the rotor. Each of the hydraulic cylinders is coupled to each of the permanent magnetic components. The hydraulic cylinders are connected to each other via at least one hydraulic tube.

In one embodiment, the number of the magnetic components is four and the number of the hydraulic cylinders is four. The four magnetic components may be spaced from each other by a same angular distance, two opposite hydraulic cylinders may be connected to each other via a first hydraulic tube, and the other two opposite hydraulic cylinders may be connected to each other via a second hydraulic tube.

Each of the hydraulic cylinders may include a piston configured to be at least partially contained in the hydraulic cylinder and to move in the hydraulic cylinder, and the piston includes one end coupled to a corresponding permanent magnetic component, and the other end having a flange.

Each of the hydraulic cylinders may further include a stopper configured to protrude from an inner surface of hydraulic cylinder toward the piston, to surround the piston, and to have an inner diameter smaller than a diameter of the flange. The piston can be stopped by the stopper when the flange reaches the stopper.

The apparatus may further include at least one accumulator connected to the at least one of the hydraulic tubes to prevent a surge of hydraulic pressure in each of the at least one of the hydraulic tubes.

In another embodiment, the first and second hydraulic tubes may be configured to connect to each other at a portion of the first and second hydraulic tubes.

In other embodiments, an apparatus include a rotor, an upper bearing configured to surround an upper portion of the rotor, and a lower bearing to surround a flange of the rotor. The rotor has a magnetic pole and is configured to rotate around an axis and have a flange on a lower portion of the rotor. The upper bearing includes a first group of permanent magnetic components which have a same magnetic pole as the magnetic pole of the rotor and are arranged to surround the flange of the rotor, and a first group of hydraulic cylinders which are respectively coupled to each of the first group of permanent magnetic components and are connected to each other via at least one hydraulic tube. The lower bearing includes a second group of permanent magnetic components which have a same magnetic pole as the magnetic pole of the rotor and are arranged to surround the flange of the rotor and support the rotor against a weight of the rotor, and a second group of hydraulic cylinders which are respectively coupled to each of the second group of permanent magnetic components and are connected to each other via at least one hydraulic tube.

A side of the flange may be downwardly slanted and upper ends of the second group of permanent magnetic components may be slanted to match to the slanted side of the flange.

The apparatus may further include a flywheel attached on a portion of the rotor between the upper portion and the lower portion. The flywheel may be configured to keep a rotational speed of the rotor.

The apparatus may further include a protection bearing arranged on a portion of the rotor where the upper and lower bearings are not arranged. The protection bearing may be configured to reduce a friction force on the rotor when the upper or lower bearing is broken.

The protection bearing may be a sliding bearing or a rolling bearing.

The apparatus may further include a third group of permanent magnetic components which have a same magnetic pole as the magnetic pole of the rotor and are arranged over a surface of the flange opposite to the surface facing the second group of permanent magnetic components.

The third group of permanent magnetic components may push down the flange of the rotor to prevent a vertical movement of the rotor.

The apparatus may further include at least one accumulator. The at least one accumulator may be connected to the at least one hydraulic tube of the upper bearing to prevent a surge of hydraulic pressure in the at least one hydraulic tube of the upper bearing.

The apparatus may further include at least one accumulator. The at least one accumulator may be connected to the at least one hydraulic tube of the lower bearing to prevent a surge of hydraulic pressure in the at least one hydraulic tube of the lower bearing.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 1B:
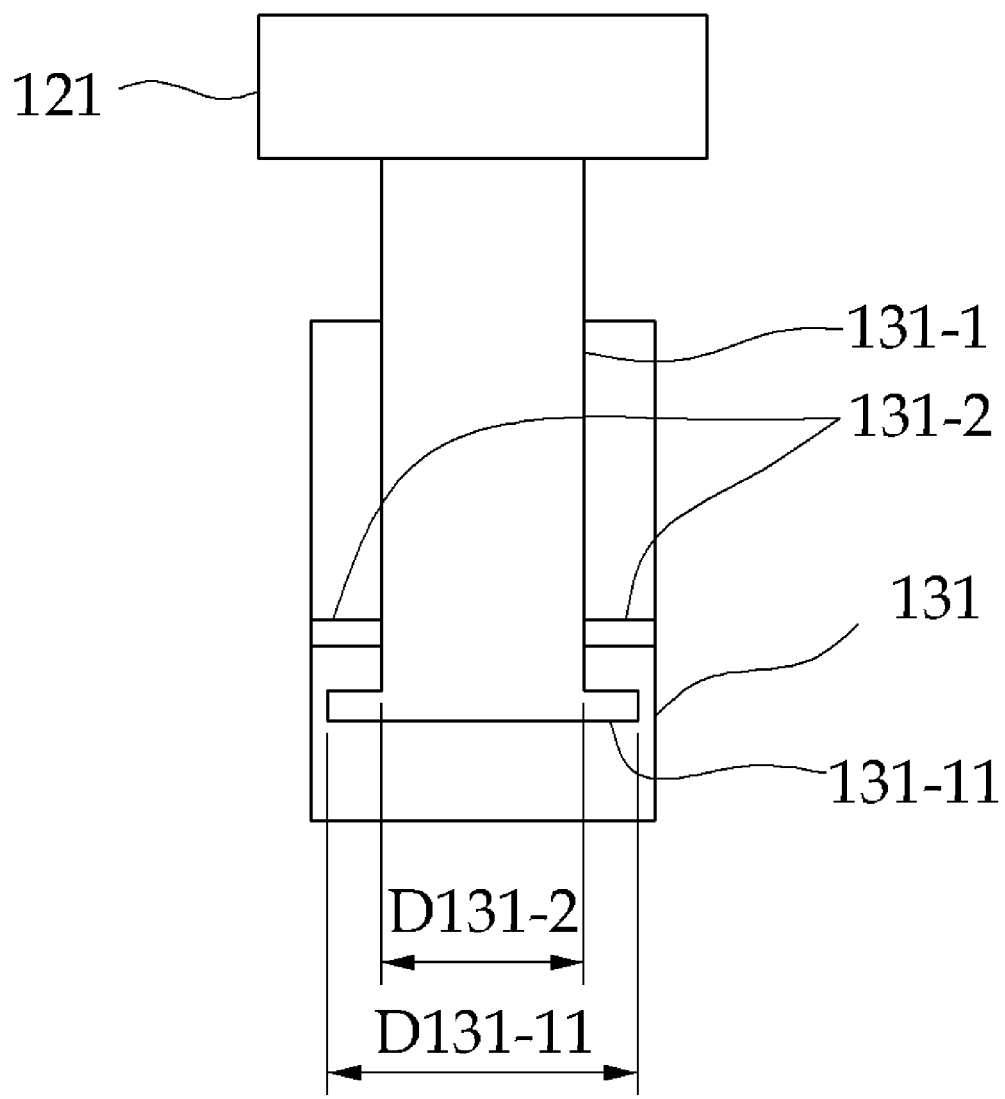

FIG. 1(a) is a horizontal sectional view of an illustrative embodiment of an apparatus to operate with a rotor and FIG. 1(b) is an enlarged diagram of a permanent magnetic component and a hydraulic cylinder of the apparatus shown in FIG. 1(a). Here, the term, "rotor" refers to a rotating part of a mechanical device. For example, the rotor may be a metallic cylinder which can be rotated by a rotatory power from an electric motor. FIG. 1(a) illustrates an apparatus 100 including permanent magnetic components 121, 122, 123 and 124 arranged to support a rotor 110 rotating around an axis 112, and hydraulic cylinders 131, 132, 133 and 134 coupled to permanent magnetic components 121, 122, 123 and 124, respectively. Here, permanent magnetic components 121, 122, 123, and 124 may be arranged to surround rotor 110 with a certain distance between each permanent magnetic component 121, 122, 123 or 124 and rotor 110, while being spaced from each other by the same angular distance to support rotor 110, by using a repulsive magnetic force generated between permanent magnetic components 121 to 124 and rotor 110, as will be described later.

Rotor 110 has a magnetic pole. For example, rotor 110 may have one of a north (N) pole and south (S) pole. Rotor 110 may have a cylinder or cone shape, and a circular horizontal section as illustrated in FIG. 1(a). Axis 112 is an imaginary line that vertically penetrates a center of rotor 110 such that rotor 110 rotates on axis 112.

Permanent magnetic components 121 to 124 have the same magnetic pole as the magnetic pole of rotor 110, and, thus, a repulsive magnetic force is generated between permanent magnetic components 121 to 124 and rotor 110. Such repulsive magnetic force maintains a certain distance between each permanent magnetic component 121, 122, 123 or 124 and rotor 110, and between adjacent permanent magnetic components 121 to 124. In one embodiment, both permanent magnetic components 121 to 124 and rotor 110 may have an N pole, and permanent magnetic components 121 to 124 may be spaced from each other by the same angular distance, for example, 90 degrees, while being arranged around rotor 110. Accordingly, a repulsive magnetic force caused by the same magnetic pole of rotor 110 and permanent magnetic components 121 to 124 supports rotor 110 without contacting rotor 110. A material for permanent magnetic components 121 to 124 may include a rare earth alloy, such as a samarium-cobalt magnet or a neodymium, without limitation.

FIG. 1(a) further illustrates that hydraulic cylinders 131 to 134 are configured to be coupled to permanent magnetic components 121 to 124, respectively. FIG. 1(b) is an enlarged diagram of the permanent magnetic component and the hydraulic cylinder shown in FIG. 1(a). Referring to FIGS. 1(a) and 1(b), hydraulic cylinders 131, 132, 133, and 134 include pistons 131-1, 132-1, 133-1, and 134-1, respectively. Each piston 131-1, 132-1, 133-1, or 134-1 can have one end coupled to each permanent magnetic component 121, 122, 123, or 124 and the other end having a flange. Each piston 131-1, 132-1, 133-1 or 134-1 can be partially provided in each hydraulic cylinder 131, 132, 133, or 134 such that the one end coupled to a corresponding permanent magnetic component is exposed to an outside of a corresponding hydraulic cylinder, and that it can linearly move back and forth inside the corresponding hydraulic cylinder. Since permanent magnetic components 121 to 124 are coupled to one end of pistons 131-1 to 134-1, respectively, each of permanent magnetic components 121 to 124 may move along with the corresponding piston, as will be described later in detail.

Hydraulic cylinders 131 to 134 may be connected to each other via at least one hydraulic tube. In one embodiment, two opposite hydraulic cylinders may be connected via a same hydraulic tube. For example, hydraulic cylinders 131 and 133, which are located opposite with respect to axis 112, are connected via a first hydraulic tube 141. Particularly, one ends of hydraulic cylinders 131 and 133, which are opposite to the ends through which pistons 131-1 and 133-1 are penetrated, are connected to both ends of first hydraulic tube 141, respectively. Thus, the hydraulic fluids which are contained in an inside of hydraulic cylinders 131 and 133 may flow into first hydraulic tube 141. Hydraulic cylinders 132 and 134, which are located opposite with respect to axis 112, are connected via a second hydraulic tube 142. Similarly, one ends of hydraulic cylinders 132 and 134 are connected to both ends of second hydraulic tube 142, respectively, so that hydraulic fluids which are contained in an inside of hydraulic cylinders 131 and 133 may flow into second hydraulic tube 142. First and second hydraulic tubes 141 and 142 are not communicated to each other. For example, the hydraulic fluids may be any kind of non-compressible fluids, such as oils, butanol, esters (for example, Bis(2-ethylhexyl)phthalate and bis(2-ethylhexyl)adipate), polyalkylene glycols (PAG), phosphate esters (for example, tributylphosphate), silicones, alkylated aromatic hydrocarbons, and polyalphaolefins (PAO) (for example, polyisobutenes), without limitation.

In one embodiment, when permanent magnetic components 121 to 124 move according to the movement of rotor 110, pistons 131-1 to 134-1 coupled with permanent magnetic components 121 to 124 are also moves. For example, when rotor 110 moves toward permanent magnetic component 121 and pushes permanent magnetic component 121 due to the repulsive magnetic force, piston 131-1, which is coupled with permanent magnetic component 121, is moved back and pushes the hydraulic fluid contained in hydraulic cylinder 131 to flow out of hydraulic cylinder 131. On the contrary, permanent magnetic component 121 can move forward to rotor 110 when a hydraulic fluid flows into hydraulic cylinder 131 and pushes piston 131-1 forward to rotor 110.

Hydraulic cylinders 131, 132, 133, and 134 may include stoppers 131-2, 132-2, 133-2, and 134-2 to limit movements of pistons 131-1, 132-1, 133-1, and 134-1, respectively. Further, pistons 131-1, 132-1, 133-1, and 134-1 may have any shape that can be stopped by stoppers 131-2, 132-2, 133-2, and 134, 2, respectively. For example, as illustrated in FIG. 1(b), hydraulic cylinder 131 can include stopper 131-2 configured to protrude from an inner surface of hydraulic cylinder 131 toward piston 131-1 and surround piston 131-1. Piston 131-1 may have a cylinder shape having a smaller diameter than an inner diameter of cylinder 131 and a flange 131-11 (shown in FIG. 1(b)) in one end. An inner diameter D131-2 of stopper 131-2 is smaller than a diameter D131-11 of flange 131-11 so that piston 131-1 can be stopped by stopper 131-2 when flange 131-11 of piston 131-1 reaches stopper 131-2. Stopper 131-2 may be located on any portion of the inner surface of hydraulic cylinder as long as stopper 131-2 is located higher than flange 131-11. In one embodiment, a particular location of stopper 131-2 on the inner surface of hydraulic cylinder 131 may be determined based on a maximum allowable radial movement of rotor 110. For example, if rotor 110 is not allowed to move relatively far from its original position, then stopper 131-2 may be located in a relatively low portion on the inner surface of hydraulic cylinder 131 so that flange 131-11 reaches stopper 131-2 quickly. If rotor 110 is allowed to move relatively far from its original position, then stopper 131-2 may be located in a relatively high portion on the inner surface of hydraulic cylinder 131 so that flange 131-11 reaches stopper 131-2 late.

FIGS. 2(a) to 2(d) are schematic diagrams of the apparatus shown in FIG. 1(a) for illustrating a movement control of the rotor shown in FIG. 1(a). For the simplicity for description, some reference numbers are omitted, and the same reference numerals are used to indicate the same elements as those shown in FIG. 1(a).

Figure 2A:
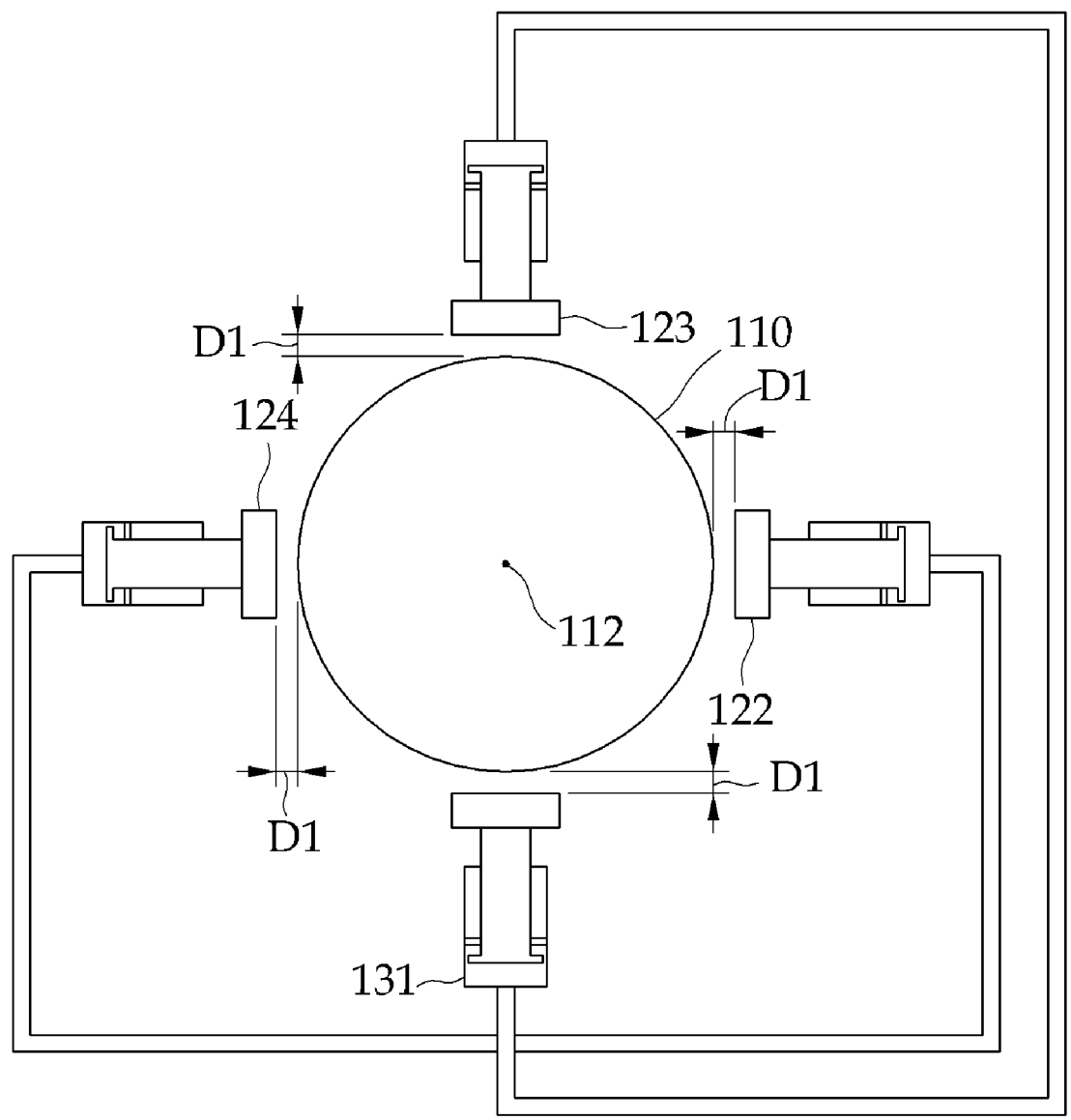
FIGS. 2(a) to 2(d) are schematic diagrams of the apparatus shown in FIG. 1(a) for illustrating a movement control of the rotor shown in FIG. 1(a).

FIG. 2(a) illustrates rotor 110 rotating around axis 112 while keeping a uniform distance "D1" from each of four permanent magnetic components 121 to 124. This is because each of permanent magnetic components 121 to 124 has the same size, and thus, each exerts the same repulsive magnetic force against rotor 110.

Figure 2B:
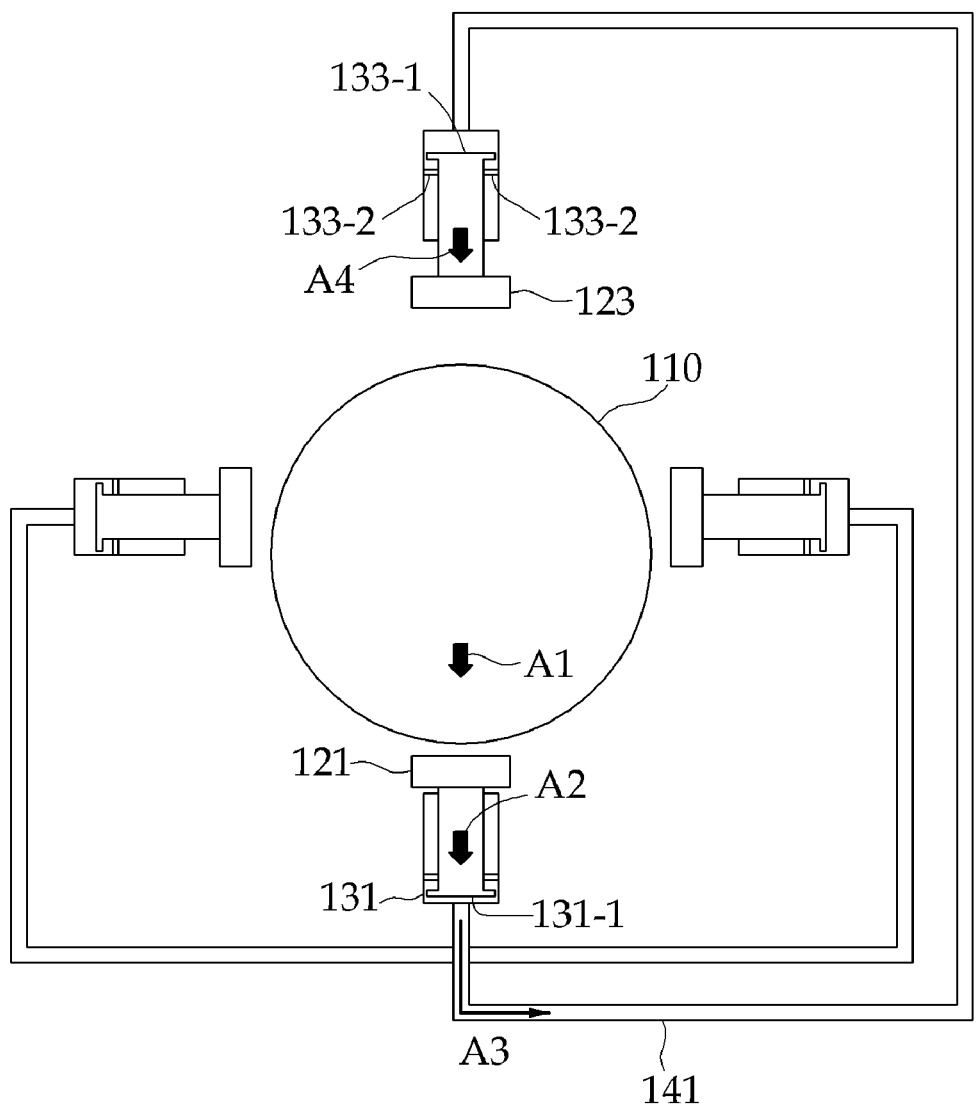

FIG. 2(b) illustrates rotor 110 moving toward one of permanent magnetic components 121 to 124, in response to an external force, such as a physical impact on rotor 110. Assuming that the external force is applied to rotor 110 in such a direction that it moves rotor 110 toward permanent magnetic component 121 (that is, a direction "A1"), a balance between the forces of permanent magnetic components 121 and 123 is broken. As rotor 110 becomes closer to permanent magnetic component 121, a repulsive magnetic force between rotor 110 and permanent magnetic component 121 increases. The increased repulsive magnetic force moves permanent magnetic component 121 and piston 131-1 toward the same direction (that is, a direction "A2") as rotor 110 moved. Since piston 131-1 is pressured in direction "A2", a fluid in hydraulic cylinder 131 flows out through first hydraulic tube 141 in a direction "A3". The fluid, which flows out of hydraulic cylinder 131, flows into hydraulic cylinder 133 along first hydraulic tube 141, and the force generated by the fluid flowing into hydraulic cylinder 133 causes piston 133-1 and permanent magnetic component 123 to move toward rotor 110, that is, toward a direction "A4", until the flange of piston 133-1 reaches stopper 133-2.

Figure 2C:
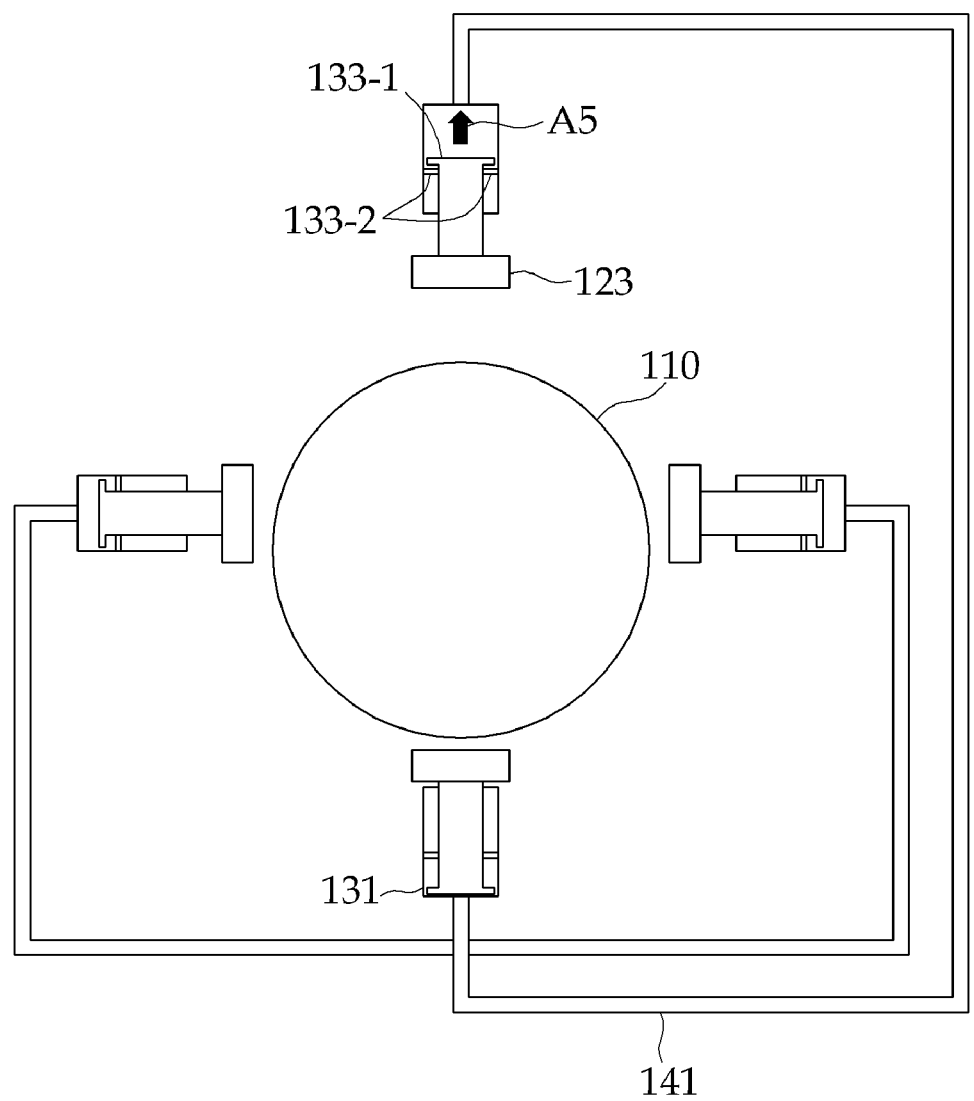

FIG. 2(c) illustrates that a reaction force is generated toward a direction "A5" once the flange of piston 133-1 reaches stopper 133-2. Particularly, piston 133-1 does not further move toward rotor 110 once the flange of piston 133-1 reaches stopper 133-2, although the fluid flows into hydraulic cylinder 133 and the flowing force of the fluid pushes piston 133-1. Thus, a reaction force is formed into direction "A5" which is opposite to the direction (for example, direction "A4" shown in FIG. 2(b)) in which piston 133-1 is moved, and is transferred to hydraulic cylinder 131 via the fluid which flows in first hydraulic tube 141. Here, the term, "reaction force" refers to a force having an equal magnitude and an opposite direction to another force.

Figure 2D:
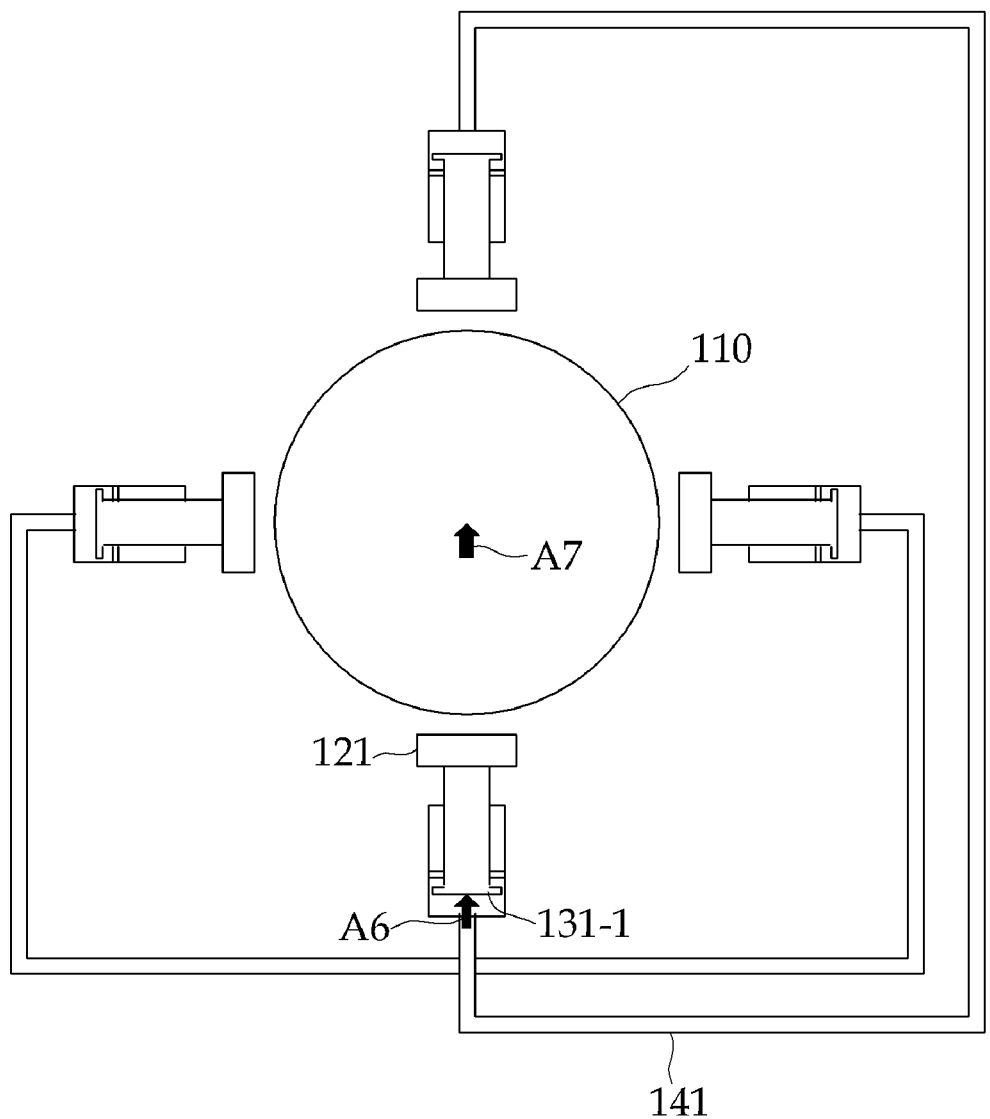

FIG. 2(d) illustrates that rotor 110 moves back to its initial position due to the transferred reaction force. Particularly, the transferred reaction force causes piston 131-1 and permanent magnetic component 121 to move toward rotor 110 (that is, toward a direction "A6"). As permanent magnetic component 121 becomes closer to rotor 110, a repulsive magnetic force between permanent magnetic component 121 and rotor 110 increases. Thus, rotor 110 moves backward from permanent magnetic component 121 (that is, toward a direction "A7"). Accordingly, rotor 110 moves back to an original position where rotor 110 had been rotating prior to the external force was applied.

Although FIGS. 2(a) to 2(d) illustrate that rotor 110 may be balanced by controlling the operation of hydraulic cylinders 131 and 133 and first hydraulic tube 141 for the simplicity of description, it is apparent to those skilled in the art that the same operation may be performed by hydraulic cylinders 132 and 134 and second hydraulic tube 142.

Figure 3:
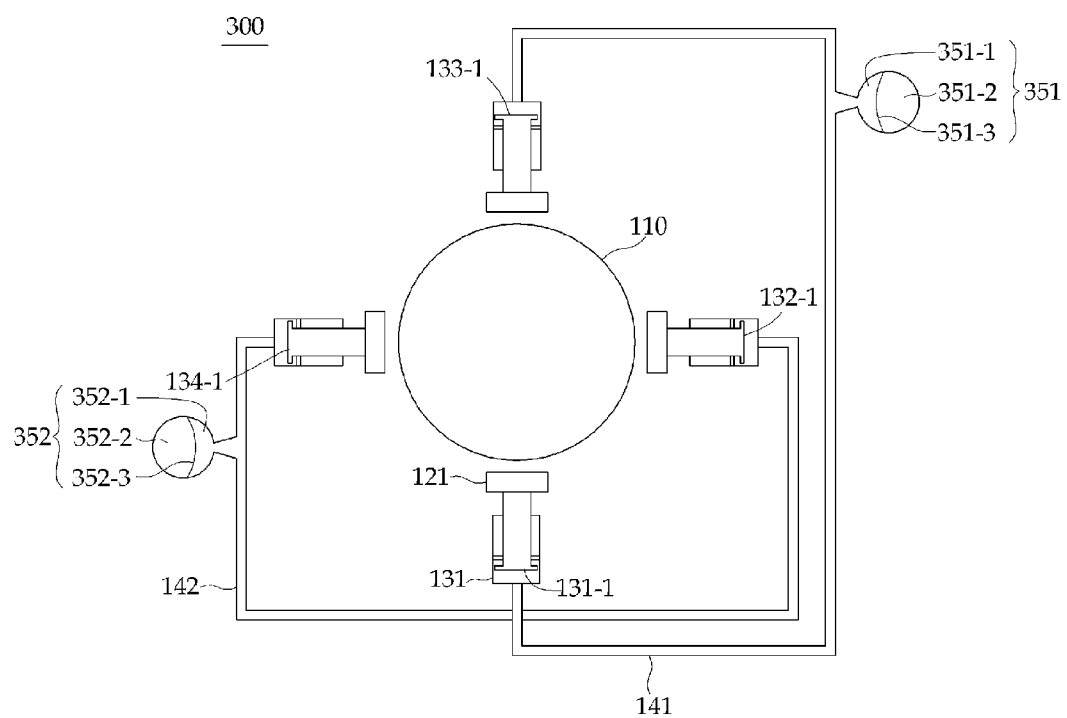
FIG. 3 is a horizontal sectional view of another illustrative embodiment of an apparatus.

FIG. 3 is a horizontal sectional view of another illustrative embodiment of an apparatus. In FIG. 3, the same elements as those shown in FIG. 1(a) are denoted by the same reference numerals and some reference numerals are omitted for the simplicity for description. An apparatus 300 is different from apparatus 100 of FIG. 1(a) in that apparatus 300 further includes accumulators 351 and 352. Here, the term, "accumulator" refers to a pressure storage reservoir configured to store a pressure caused by movement of the fluid flowing in first or second hydraulic tube 141 or 142. Accumulator 351 is connected to a portion of first hydraulic tube 141 and accumulator 352 is connected to a portion of second hydraulic tube 142. Each of accumulators 351 and 352 may be any known type of an accumulator that can store pressure caused by the movement of fluids in first and second hydraulic tubes 141 and 142. For example, each of accumulators 351 and 352 may be a bladder-type accumulator. Accumulator 351 may have a globe-shaped hollow having an elastic diaphragm 351-3 therein. Elastic diaphragm 351-3 separates the inside of the globe-shaped hollow into two chambers, i.e., first and second chambers 351-1 and 351-2. First chamber 351-1 contains a hydraulic fluid and is connected to a portion of first hydraulic tube 141. Second chamber 351-2 contains an inert gas (for example, nitrogen, without limitation) that provides a compressive force on the hydraulic fluid. As a hydraulic fluid flows from first hydraulic tube 141 into first chamber 351-1, a volume of the inert gas in second chamber 351-2 decreases and, thus, a pressure of the inert gas increases. The increased pressure is stored in the inert gas until the hydraulic fluid flows out of first chamber 351-1. Accumulator 352 may also have the same constitution and operation as those of accumulator 351. Accumulators 351 and 352 can prevent a surge of hydraulic pressure in first and second hydraulic tubes 141 and 142. Here, the term, "hydraulic pressure" refers to a pressure of hydraulic fluids flowing in first and second hydraulic tubes 141 and 142. For example, assuming that rotor 110 suddenly moves toward permanent magnetic component 121, permanent magnetic component 121 will rapidly move to the same direction as rotor 110 moved, and, thus, a hydraulic fluid contained in hydraulic cylinder 131 will rapidly move along first hydraulic tube 141 being inversely proportional to the sectional area between flange 131-1 and tube 141. The rapid movement of the hydraulic fluid can be controlled by storing the increment of hydraulic pressure due to the rapid movement of hydraulic fluid in accumulator 351. Accordingly, the change of hydraulic pressure in first hydraulic tube 141 becomes smaller, and a surge of hydraulic pressure in hydraulic tube 141 can be prevented.

Figure 4:
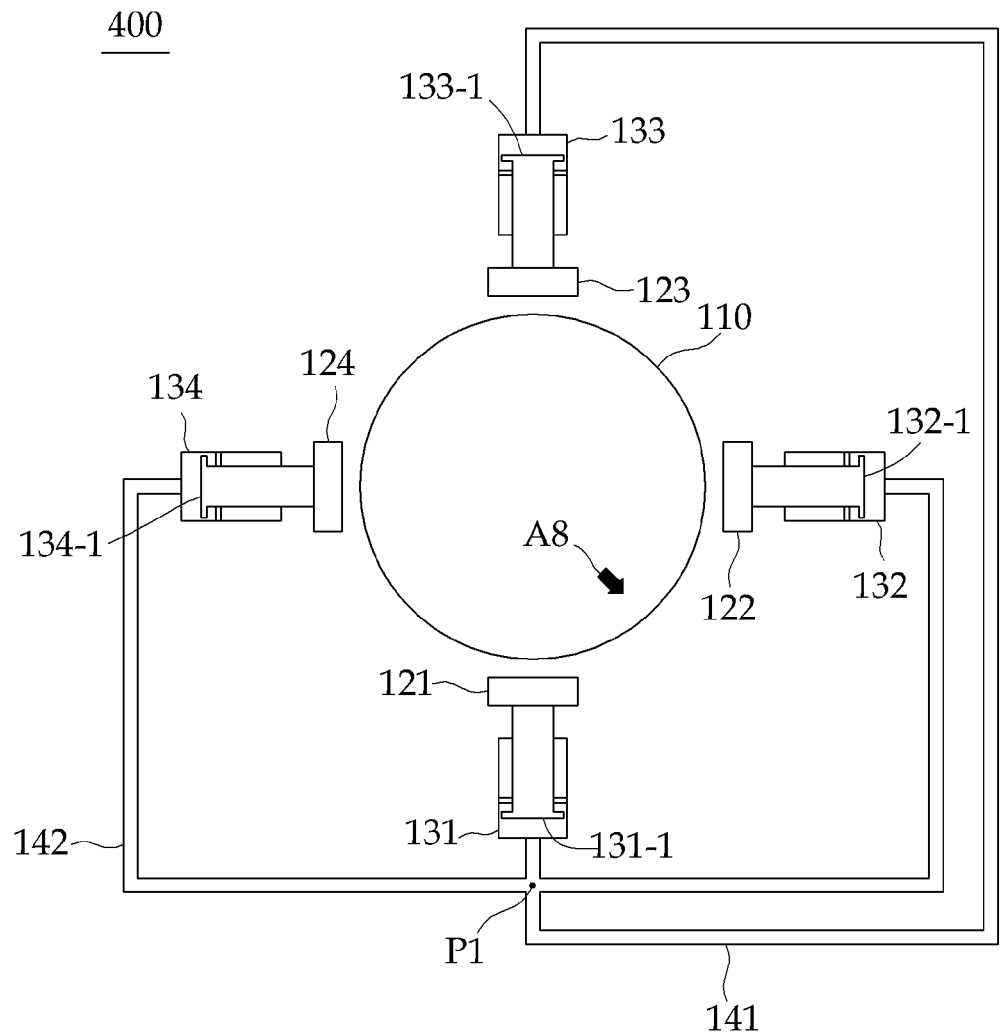
FIG. 4 is a horizontal sectional view of still another illustrative embodiment of an apparatus.

FIG. 4 is a horizontal sectional view of still another illustrative embodiment of an apparatus. In FIG. 4, the same elements as those shown in FIG. 1(a) are denoted by the same reference numerals. An apparatus 400 is different from apparatus 100 of FIG. 1(a) in that apparatus 400 includes an integrated hydraulic tube. FIG. 4 illustrates that first and second hydraulic tubes 141 and 142 are communicated at a portion that first and second hydraulic tubes 141 and 142 are intersected (for example, a portion of a point P1). In the integrated hydraulic tube, a fluid can flow through both first and second hydraulic tubes 141 and 142. The integrated hydraulic tube enables all of hydraulic cylinders 131 to 134 to cooperate to control a movement of rotor 110. For example, assuming that rotor 110 moves to a direction "A8" between permanent magnetic components 121 and 122, the repulsive magnetic force between rotor 110 and permanent magnetic components 121 and 122 will be increased. This increased repulsive magnetic force causes permanent magnetic components 121 and 122 and pistons 131-1 and 132-1 fixed thereto to move backward along hydraulic cylinders 131 and 132, respectively. The movement of pistons 131-1 and 132-1 causes fluids to flow out of hydraulic cylinders 131 and 132 and to flow into the other two hydraulic cylinders, for example, hydraulic cylinders 133 and 134. And then, the force generated by the fluids flowing into hydraulic cylinders 133 and 134 causes pistons 133-1 and 134-1 and permanent magnetic components 123 and 124 to move toward rotor 110, until the flanges of pistons 133-1 and 134-1 reach stoppers 133-2 and 134-2.

As described above for FIG. 1(*a*), reaction forces occur in hydraulic cylinder 133 and 134 and are transferred to hydraulic cylinders 131 and 132. Accordingly, permanent magnetic components 121 and 122 will move back toward rotor 110 and push rotor 110 back by a repulsive magnetic force. Although first and second hydraulic tubes 141 and 142 are communicated at point P1 in FIG. 4 for the purpose of description, first and second hydraulic tubes 141 and 142 may be communicated at any point such that first and second hydraulic tubes 141 and 142 meet and cooperate to control a movement of rotor 110.

In another embodiment, apparatus 400 may further include an accumulator at any portion on the integrated hydraulic tube of first and second hydraulic tubes 141 and 142. The constitution and function of the accumulator are substantially the same as the constitution and function described above for accumulator 351 or 352 of FIG. 3.

Although FIGS. 1(*a*), 3, and 4 show that apparatus 100, 300, or 400 includes four permanent magnetic components 121 to 124 and four hydraulic cylinders 131 to 134 for the purpose of description, an apparatus may include more or less than four permanent magnetic components and four hydraulic cylinders as long as the permanent magnetic components can support a rotor.

Figure 5A:
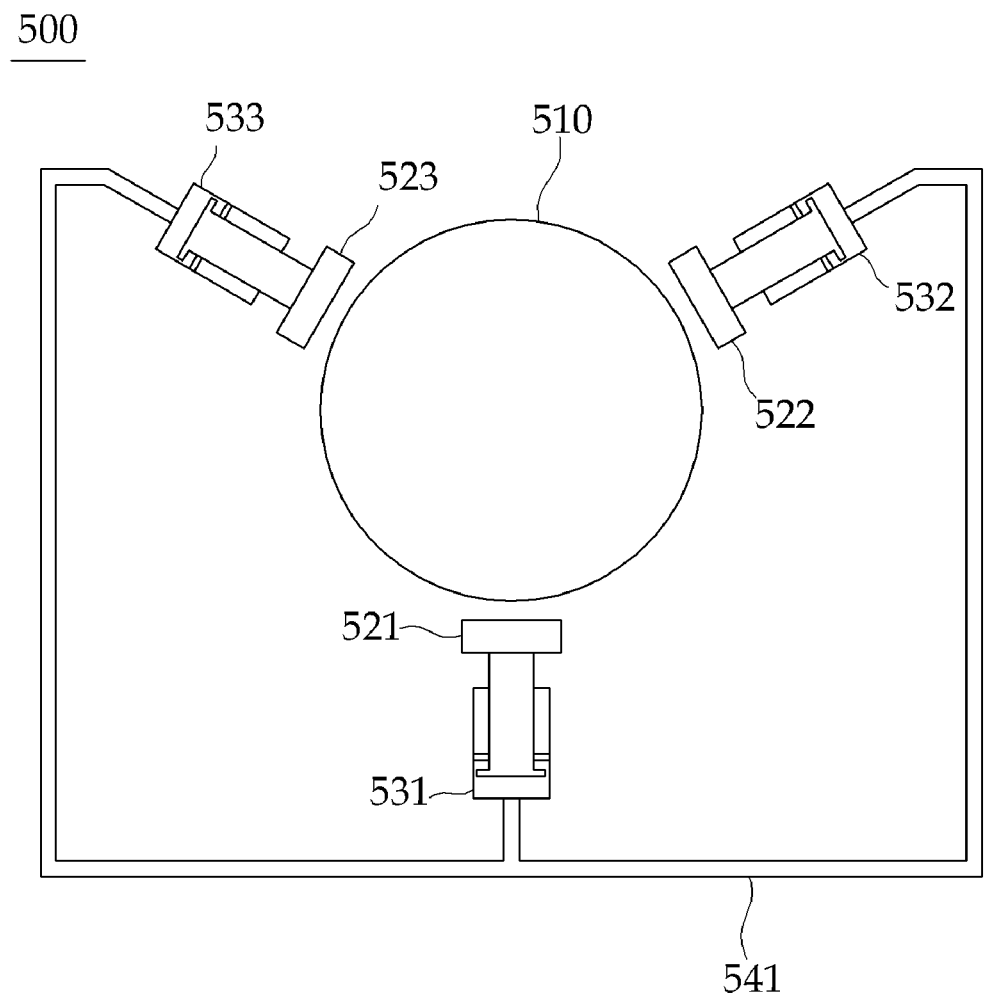
FIGS. 5(a) and 5(b) are horizontal sectional views of other illustrative embodiments of an apparatus to operate with a rotor.
Figure 5B:
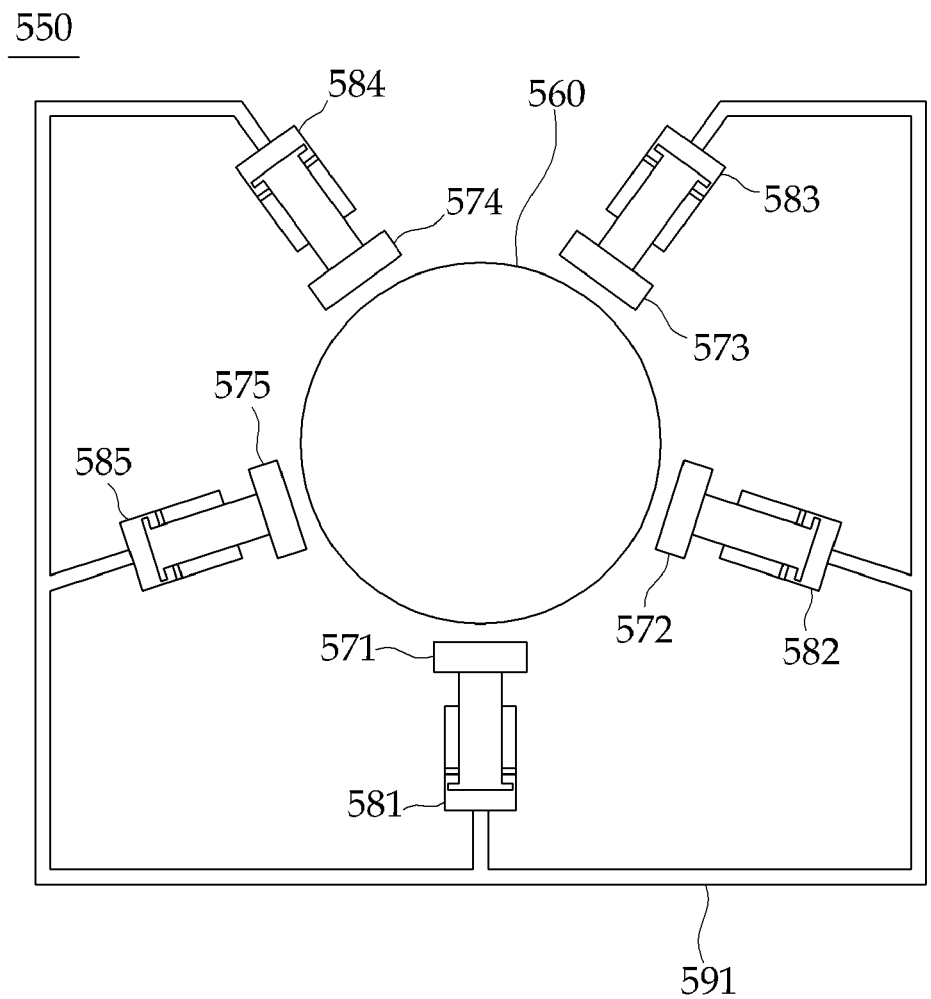

FIGS. 5(*a*) and 5(*b*) are horizontal sectional views of other illustrative embodiments of an apparatus to operate with a rotor. FIG. 5(*a*) illustrates that an apparatus 500 includes three magnetic components 521 to 523 and three hydraulic cylinders 531 to 533 coupled to three magnetic components 521 to 523, respectively. Three permanent magnetic components 521 to 523 may be arranged to surround a rotor 510 and may be spaced from each other by the same angular distance, that is, 120 degrees. Three hydraulic cylinders 531 to 533 may be connected via a hydraulic tube 541. The functions and constitutions of rotor 510, permanent magnetic components 521 to 523, hydraulic cylinders 531 to 533, and hydraulic tube 541 are substantially the same as the functions and constitutions described above for rotor 110, permanent magnetic components 121 to 124, hydraulic cylinders 131 to 134, and first and second hydraulic tubes 141 and 142 of FIG. 1(*a*), respectively.

FIG. 5(*b*) illustrates an apparatus 550 including five magnetic components 571 to 575 and five hydraulic cylinders 581 to 585 coupled to five magnetic components 571 to 575, respectively. Five permanent magnetic components 571 to 575 may be arranged to surround a rotor 560 and may be spaced from each other by the same angular distance, that is, 72 degrees. Five hydraulic cylinders 581 to 585 may be connected via a hydraulic tube 591. The functions and constitutions of rotor 560, permanent magnetic components 571 to 575, hydraulic cylinders 581 to 585, and hydraulic tube 591 are substantially the same as the functions and constitutions described above for rotor 110, permanent magnetic components 121 to 124, hydraulic cylinders 131 to 134, and first and second hydraulic tubes 141 and 142 of FIG. 1(*a*), respectively.

Figure 6:
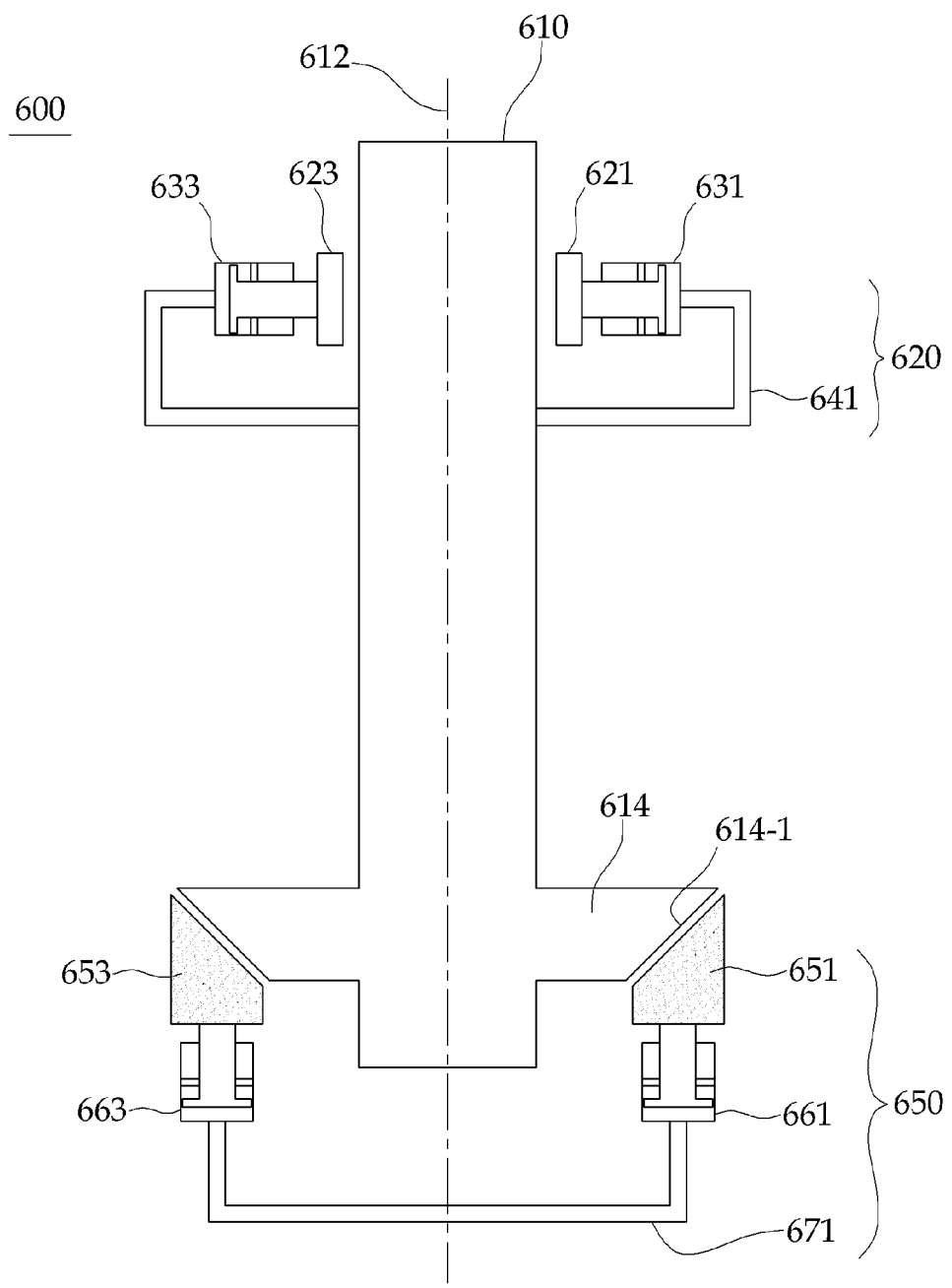
FIG. 6 is a vertical sectional view of an illustrative embodiment of an apparatus including a rotor and a bearing device.

FIG. 6 is a vertical sectional view of an illustrative embodiment of an apparatus including a rotor and bearing devices. Apparatus 600 includes a rotor 610, an upper bearing 620 configured to surround an upper portion of rotor 610, and a lower bearing 650 configured to surround a flange 614 extended in a radial direction from a lower portion of rotor 610. In one embodiment, flange 614 may have downwardly slanted side 614-1 as illustrated in FIG. 6. Rotor 610 has a magnetic pole (N pole or S pole) and is configured to rotate around an axis 612.

Upper bearing 620 includes a first group of permanent magnetic components 621 and 623 arranged to surround the upper portion of rotor 610 and a first group of hydraulic cylinders 631 and 633 coupled to permanent magnetic components 621 and 623, respectively. Permanent magnetic components 621 and 623 have the same magnetic pole as the magnetic pole of rotor 610 such that permanent magnetic components 621 and 623 support the upper portion of rotor 610 by a repulsive magnetic force without contacting rotor 610. Hydraulic cylinders 631 and 633 are connected to each other via a hydraulic tube 641. Although FIG. 6 shows that upper bearing 620 includes two permanent magnetic components and two hydraulic cylinders for the purpose of description, it is apparent to those skilled in the art that upper bearing 620 may include more than two permanent magnetic components and more than two hydraulic cylinders. For example, four permanent magnetic components and hydraulic cylinders may be arranged with the same angular distance (i.e., 90 degrees) as permanent magnetic components 121 to 124 and hydraulic cylinders 131 to 134 as illustrated in FIG. 1(*a*). The functions and constitutions of permanent magnetic components 621 and 623, hydraulic cylinders 631 and 633, and hydraulic tube 641 are substantially the same as the functions and constitutions described above for permanent magnetic components 121 to 124, hydraulic cylinders 131 to 134, and first and second hydraulic tubes 141 and 142 of FIG. 1(*a*), respectively.

Lower bearing 650 includes a second group of permanent magnetic components 651 and 653 arranged to surround flange 614 of rotor 610. Permanent magnetic components 651 and 653 have the same magnetic pole as the magnetic pole of rotor 610. Permanent magnetic components 651 and 653 may be arranged to surround flange 614 of rotor 610 and to support rotor 610 against a weight of rotor 610. In some embodiments where flange 614 have downwardly slanted side 614-1, upper ends of permanent magnetic components 651 and 653 may be upwardly slanted to match slanted side 614-1 of flange 614, as illustrated in FIG. 6. Hydraulic cylinders 661 and 663 are coupled to permanent magnetic components 651 and 653, respectively. Hydraulic cylinders 661 and 663 are connected via a hydraulic tube 671. Although FIG. 6 illustrates that lower bearing 650 includes two permanent magnetic components and two hydraulic cylinders for the purpose of description, it is apparent to those skilled in the art that lower bearing 650 may include more than two permanent magnetic components and more than two hydraulic cylinders. For example, four permanent magnetic components and hydraulic cylinders may be arranged with the same angular distance (i.e., with 90 degrees) as illustrated in FIG. 1(*a*). The functions and constitutions of permanent magnetic components 651 and 653 are substantially the same as the functions and constitutions described above for permanent magnetic components 121 to 124 of FIG. 1(a) except the shapes of permanent magnetic components 651 and 653. The functions and constitutions of hydraulic cylinders 661 and 663 and hydraulic tube 671 are substantially the same as the functions and constitutions described above for hydraulic cylinders 131 to 134 and first and second hydraulic tubes 141 and 142 of FIG. 1(a), respectively.

Since side 614-1 of flange 614 and the upper ends of permanent magnetic components 651 and 653 are slanted, lower bearing 650 can not only control a radial movement of rotor 610 but also support rotor 610 against a weight of rotor 610.

Figure 7:
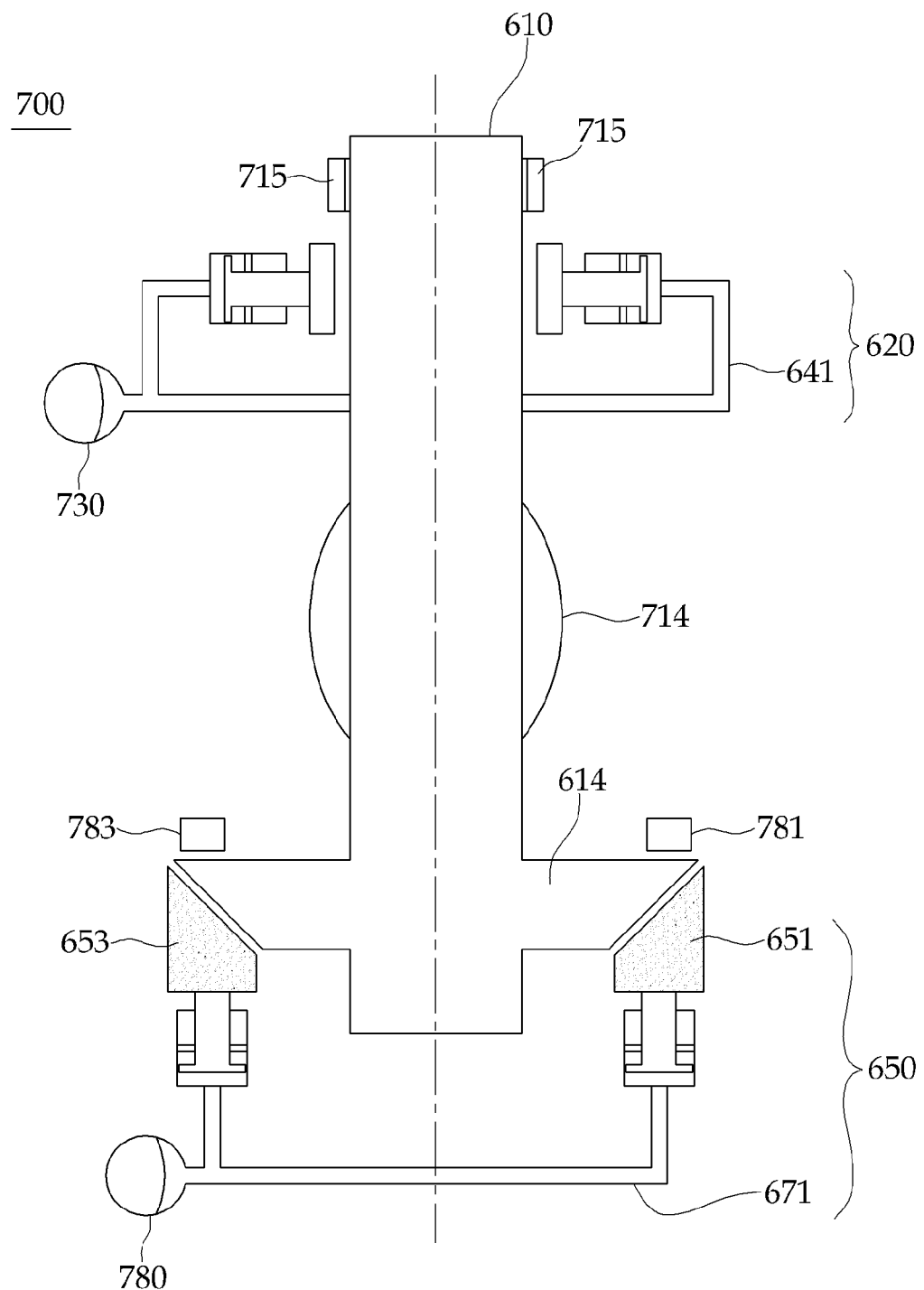
FIG. 7 is a vertical sectional view of another illustrative embodiment of an apparatus including a rotor and a bearing device.

FIG. 7 is a vertical sectional view of another illustrative embodiment of an apparatus including a rotor and bearing devices. In FIG. 7, the same elements as those shown in FIG. 6 are denoted by the same reference numerals and some reference numerals are omitted for the simplicity of description. An apparatus 700 of FIG. 7 is different from apparatus 600 of FIG. 6 in that apparatus 700 further includes a flywheel 714 to keep a rotational speed of rotor 610, a protection bearing 715 to be used in an emergency, a third group of permanent magnetic components 781 and 783 to prevent a vertical movement of rotor 610, and/or accumulators 730 and 780 to prevent a surge of hydraulic pressure of 620 or 650 system.

Flywheel 714 may be optionally attached on a portion of rotor 610 between the upper portion of rotor 610 where upper bearing 620 is arranged and the lower portion of rotor 610 where flange 614 is arranged, to surround rotor 610. For example, flywheel 714 may be attached around a center of mass of rotor 610. Here, the term, "flywheel," refers to a mechanical device with a significant moment of inertia used as a storage device for rotational energy. Due to its moment of inertia, flywheel 714 resists changes in its rotational speed, and thus keeps a rotational speed of rotor 610.

Protection bearing 715 may be optionally arranged on a portion of rotor 610 where upper and lower bearings 620 and 650 are not located. For example, protection bearing 715 may be arranged on a portion of rotor 610 higher than the upper portion where upper bearing 620 is located. Protection bearing 715 is used to reduce a friction force applied to rotor 610 in an emergency (for example, when upper or lower bearing 620 or 650 is broken.). Protection bearing 715 may be any known type of a bearing. For example, protection bearing 715 may be a sliding bearing or a rolling bearing which is well known in the art, without limitation.

Permanent magnetic components 781 and 783 may be optionally arranged over an upper surface of flange 614 opposite to the surface facing permanent magnetic components 651 and 653, respectively. Permanent magnetic components 781 and 783 have the same magnetic pole as the magnetic pole of rotor 110. Permanent magnetic components 781 and 783 push flange 614 of rotor 610 downwardly using a repulsive magnetic force, and, thus, prevent a vertical movement of rotor 610.

Accumulators 730 and 780 may be optionally connected to hydraulic tubes 641 and 671, respectively. As described for accumulator 352 of FIG. 3, accumulators 730 and 780 prevent a surge of hydraulic pressure in hydraulic tubes 641 and 671, respectively. The functions and constitutions of accumulators 730 and 780 are substantially the same as the functions and constitutions described above for accumulators 351 and 352 of FIG. 3.

According to the foresaid embodiments, a radial movement of a rotor can be controlled with permanent magnets and hydraulic system and without any active bearing device including a sensor and an external power source.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An apparatus to operate with a rotor comprising:
   a plurality of permanent magnetic components having a same magnetic pole as a magnetic pole of the rotor, the permanent magnetic components arranged to surround the rotor; and
   a plurality of hydraulic cylinders, each coupled to each of the plurality of permanent magnetic components, the hydraulic cylinders being connected to each other via at least one hydraulic tube.

2. The apparatus of claim 1, wherein the number of the permanent magnetic components is four and the number of the hydraulic cylinders is four,
   wherein the four permanent magnetic components are spaced from each other by a same angular distance, and
   wherein two opposite hydraulic cylinders are connected to each other via a first hydraulic tube, and the other two opposite hydraulic cylinders are connected to each other via a second hydraulic tube.

3. The apparatus of claim 1, wherein each of the hydraulic cylinders comprises a piston configured to be at least partially contained in the hydraulic cylinder and to move in the hydraulic cylinder, wherein the piston comprises one end coupled to a corresponding permanent magnetic component, and the other end having a flange.

4. The apparatus of claim 3, wherein each of the hydraulic cylinders further comprises a stopper configured to protrude from an inner surface of the hydraulic cylinder toward the piston, to surround the piston, and to have an inner diameter smaller than a diameter of the flange,
   wherein the piston can be stopped by the stopper when the flange reaches the stopper.

5. The apparatus of claim 1, further comprising at least one accumulator connected to the at least one of the hydraulic tubes to prevent a surge of hydraulic pressure in the at least one of the hydraulic tubes.

6. The apparatus of claim 2, wherein the first and second hydraulic tubes are configured to be communicated to each other at a portion of the first and second hydraulic tubes.

7. An apparatus comprising:
   a rotor, having a magnetic pole, configured to rotate around an axis and to have a flange on a lower portion of the rotor;
   an upper bearing configured to surround an upper portion of the rotor, the upper bearing comprising:
      a first group of permanent magnetic components having a same magnetic pole as the magnetic pole of the rotor and arranged to surround the upper portion of the rotor; and
      a first group of hydraulic cylinders, each coupled to each of the first group of permanent magnetic components, the hydraulic cylinders connected to each other via at least one hydraulic tube; and
   a lower bearing configured to surround the flange of the rotor, the lower bearing comprising:
      a second group of permanent magnetic components having a same magnetic pole as the magnetic pole of the rotor and arranged to surround the flange of the rotor and to support the rotor against a weight of the rotor; and
      a second group of hydraulic cylinders, each coupled to each of the second group of permanent magnetic components, the hydraulic cylinders connected to each other via at least one hydraulic tube.

8. The apparatus of claim 7, wherein a side of the flange is downwardly slanted and upper ends of the second group of permanent magnetic components are slanted to match to the slanted side of the flange.

9. The apparatus of claim 7, further comprising a flywheel attached on a portion of the rotor between the upper portion and the lower portion, the flywheel configured to keep a rotational speed of the rotor.

10. The apparatus of claim 7, further comprising a protection bearing arranged on a portion of the rotor where the upper and lower bearings are not arranged, the protection bearing configured to reduce a friction force on the rotor when the upper or lower bearing is broken.

11. The apparatus of claim 10, wherein the protection bearing is a sliding bearing or a rolling bearing.

12. The apparatus of claim 7, further comprising a third group of permanent magnetic components having a same magnetic pole as the magnetic pole of the rotor, the third group of permanent magnetic components being arranged over a surface of the flange opposite to the surface facing the second group of permanent magnetic components.

13. The apparatus of claim 12, wherein the third group of permanent magnetic components push down the flange of the rotor to prevent a vertical movement of the rotor.

14. The apparatus of claim 7, further comprising at least one accumulator, connected to the at least one hydraulic tube of the upper bearing to prevent a surge of hydraulic pressure in the at least one hydraulic tube of the upper bearing.

15. The apparatus of claim 7, further comprising at least one accumulator, connected to the at least one hydraulic tube of the lower bearing to prevent a surge of hydraulic pressure in the at least one hydraulic tube of the lower bearing.

* * * * *